US012574421B2

(12) United States Patent
Bateman et al.

(10) Patent No.: US 12,574,421 B2
(45) Date of Patent: Mar. 10, 2026

(54) ADDING POLICY CODING TO PACKET HEADERS FOR A USER AT A CLIENT DEVICE TO USE TO ACCESS RESOURCES IN A SECURE NETWORK

(71) Applicant: INTERNATIONAL BUSINESS MACHINES CORPORATION, Armonk, NY (US)

(72) Inventors: Ralph Bateman, Southampton (GB); Scott Moonen, Fuquay Varina, NC (US); Lee Simon Cooper, Portsmouth (GB)

(73) Assignee: International Business Machines Corporation, Armonk, NY (US)

(*) Notice: Subject to any disclaimer, the term of this patent is extended or adjusted under 35 U.S.C. 154(b) by 154 days.

(21) Appl. No.: 18/748,666

(22) Filed: Jun. 20, 2024

(65) Prior Publication Data

US 2025/0392623 A1     Dec. 25, 2025

(51) Int. Cl.
    *H04L 9/40*              (2022.01)
(52) U.S. Cl.
    CPC .......... *H04L 63/20* (2013.01); *H04L 63/0272* (2013.01)
(58) Field of Classification Search
    CPC ........................... H04L 63/20; H04L 63/0272
    See application file for complete search history.

(56) References Cited

U.S. PATENT DOCUMENTS

| | | | |
|---|---|---|---|
| 11,470,100 B1 | 10/2022 | Christian | |
| 11,533,307 B2 | 12/2022 | Mahajan | |
| 11,962,572 B2 | 4/2024 | Sapp | |

| | | | | |
|---|---|---|---|---|
| 2004/0083295 A1* | 4/2004 | Amara | ................ | H04L 12/4633 709/229 |
| 2007/0107061 A1 | 5/2007 | Engle et al. | | |
| 2007/0147378 A1* | 6/2007 | Elgebaly | ............. | H04L 63/0272 370/392 |
| 2009/0307751 A1 | 12/2009 | Lin et al. | | |
| 2013/0139241 A1 | 5/2013 | Leeder | | |
| 2015/0117217 A1 | 4/2015 | Stallard et al. | | |
| 2016/0294703 A1 | 10/2016 | Langton et al. | | |

(Continued)

OTHER PUBLICATIONS

International Searching Authority, "Notification of Transmittal of the International Search Report and the Written Opinion of the International Searching Authority, or Declaration," Patent Cooperation Treaty Aug. 14, 2025, 15 pages, International Application No. PCT/EP2025/063535.

(Continued)

*Primary Examiner* — Bryan Y Lee

(74) *Attorney, Agent, or Firm* — Konrad, Raynes, Davda & Victor LLP; David Victor

(57) ABSTRACT

Provided are a computer program product, system, and method for adding policy coding to packet headers for a user at a client device to use to access resources in a secure network. Packets are received from a user at a client device. A determination is made of policy information for the user defining user permissions to access resources in the secure network. Packets from the user are decapsulated and policy information into is included in packet headers of the decapsulated packets to transmit within the secure network. An enforcement point applies policy rules to the policy information in the packet headers to determine whether to forward the packets to a destination resource.

20 Claims, 7 Drawing Sheets

(56) References Cited

U.S. PATENT DOCUMENTS

| | | |
|---|---|---|
| 2020/0059459 A1 | 2/2020 | Abraham et al. |
| 2021/0160237 A1 | 5/2021 | Rozner |
| 2021/0227056 A1 | 7/2021 | Aluvala et al. |
| 2022/0210067 A1 | 6/2022 | Gross, IV |
| 2023/0043721 A1 | 2/2023 | Liu |
| 2023/0254318 A1 | 8/2023 | Hu |
| 2023/0353362 A1 | 11/2023 | Dyer |
| 2023/0362067 A1 | 11/2023 | Natal |
| 2023/0421538 A1 | 12/2023 | Ponaka et al. |

OTHER PUBLICATIONS

United States Non-Final Rejection dated Sep. 9, 2025, 17 pages, in U.S. Appl. No. 18/748,596.
"About eBPF | Calico Documentation". [Online][Retrieved Jun. 5, 2024], 8pp. https://docs.tigera.io/calico/latest/about/kubernetes-training/about-ebpf#types-of-ebpf-program.
"List of IBM Patents or Patent Applications Treated as Related", Jun. 20, 2024, 2pp.
Cisco Systems, Inc., "IPv6 Extension Headers Review and Considerations", Oct. 2006, 12 pp., [Online] [Retrieved Jun. 5, 2024]. https://www.cisco.com/en/US/technologies/tk648/tk872/technologies_white_paper0900aecd8054d37d.html.
IBM Corporation, U.S. Appl. No. 18/748,596, filed Jun. 20, 2024, 35pp.
National Cyber Security Centre, "Zero Trust Architecture Design Principles", Jul. 23, 2021. [Online][Retrieved Apr. 22, 2024], 5pp. https://www.ncsc.gov.uk/collection/zero-trust-architecture.
Rose, S., et al., "Zero Trust Architecture", National Institute of Standards and Technology, U.S. Department of Commerce, Aug. 10, 2020. [Online][Retrieved Jun. 18, 2024], 59pp. https://www.nist.gov/publications/zero-trust-architecture.
S. Deering, et al., "Internet Protocol, Version 6 (IPv6) Specification", Internet Engineering Task Force (IETF), Jul. 2017, [Online][Retrieved Jun. 18, 2024], 42 pp. https://www.rfc-editor.org/rfc/rfc8200.html#page-23.

* cited by examiner

200

Packet

300

Policy Information

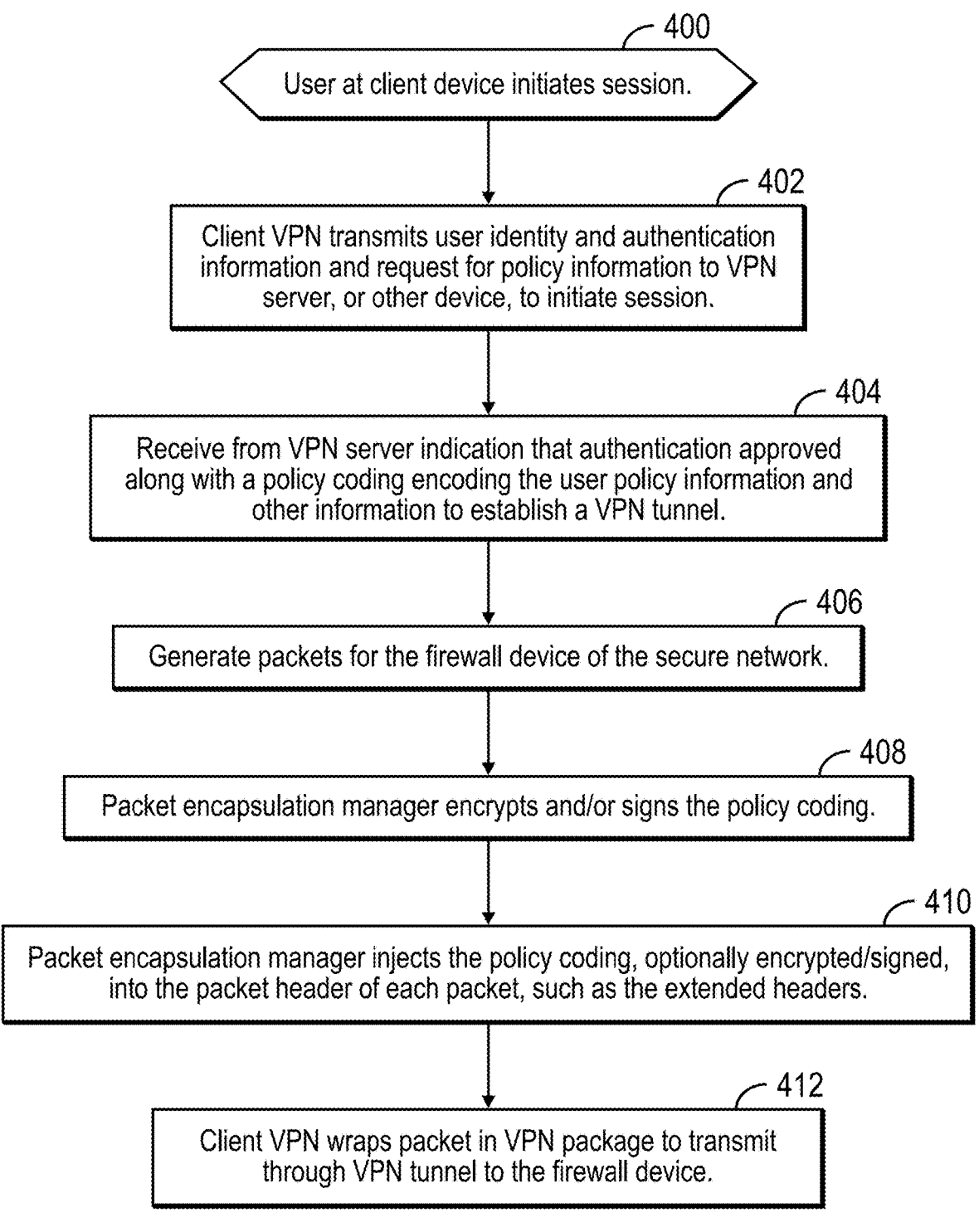

400

User at client device initiates session.

402

Client VPN transmits user identity and authentication information and request for policy information to VPN server, or other device, to initiate session.

404

Receive from VPN server indication that authentication approved along with a policy coding encoding the user policy information and other information to establish a VPN tunnel.

406

Generate packets for the firewall device of the secure network.

408

Packet encapsulation manager encrypts and/or signs the policy coding.

410

Packet encapsulation manager injects the policy coding, optionally encrypted/signed, into the packet header of each packet, such as the extended headers.

412

Client VPN wraps packet in VPN package to transmit through VPN tunnel to the firewall device.

FIG. 4

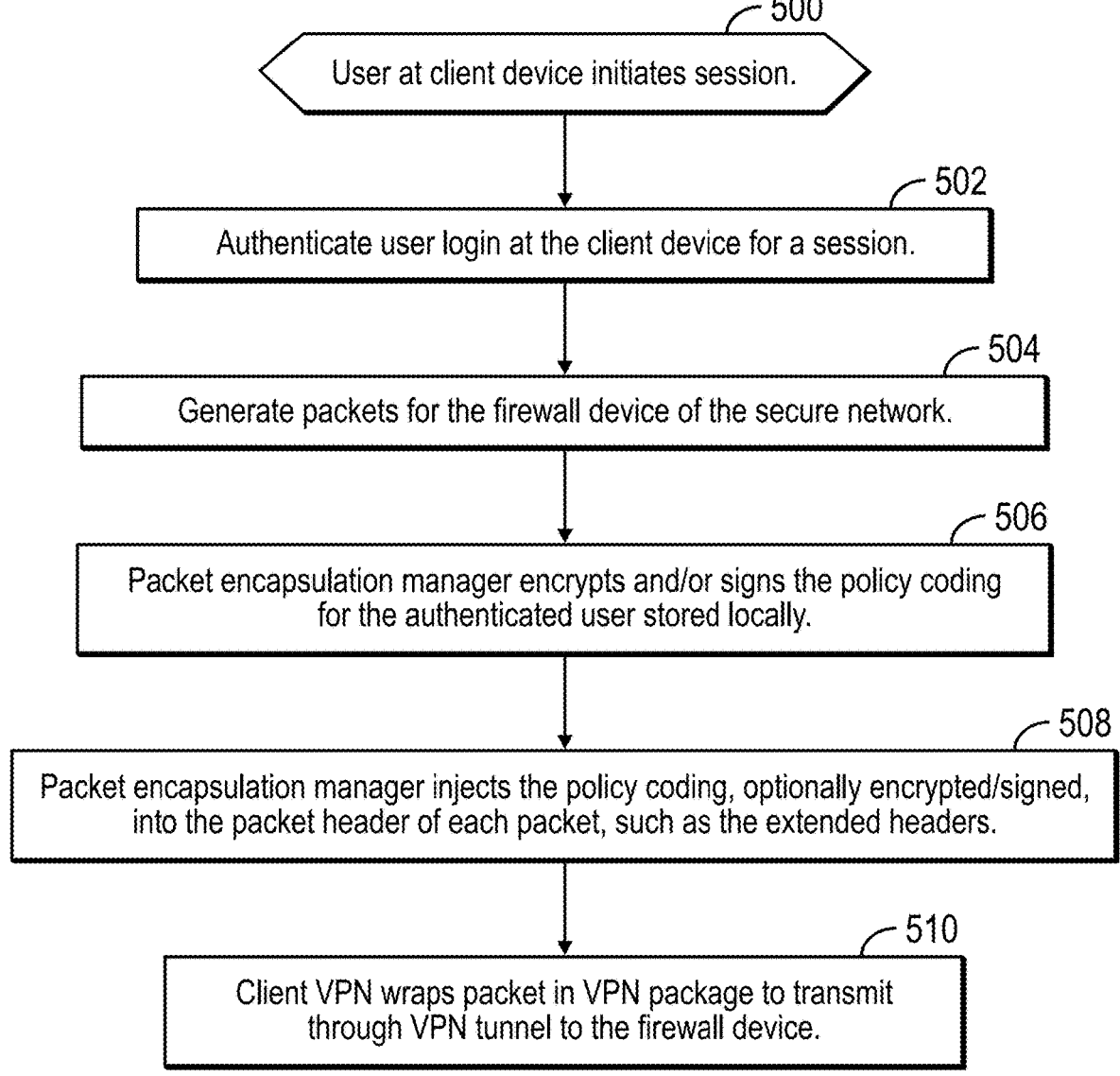

FIG. 5

500
User at client device initiates session.

502
Authenticate user login at the client device for a session.

504
Generate packets for the firewall device of the secure network.

506
Packet encapsulation manager encrypts and/or signs the policy coding for the authenticated user stored locally.

508
Packet encapsulation manager injects the policy coding, optionally encrypted/signed, into the packet header of each packet, such as the extended headers.

510
Client VPN wraps packet in VPN package to transmit through VPN tunnel to the firewall device.

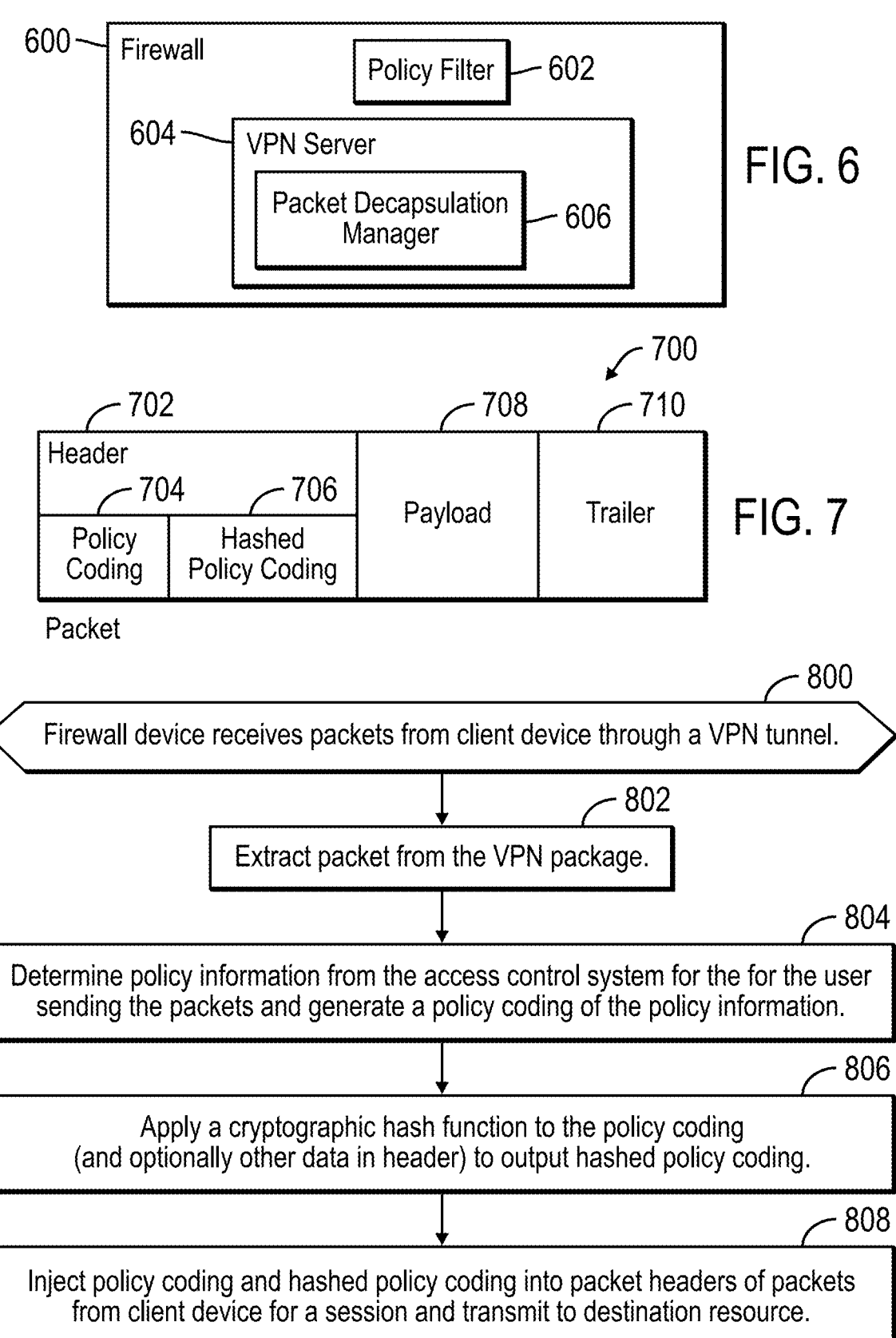

600 — Firewall

Policy Filter — 602

604 — VPN Server

Packet Decapsulation Manager — 606

Header 704          706

Policy Coding | Hashed Policy Coding

708 Payload

710 Trailer

FIG. 7

Packet

800

Firewall device receives packets from client device through a VPN tunnel.

802

Extract packet from the VPN package.

804

Determine policy information from the access control system for the for the user sending the packets and generate a policy coding of the policy information.

806

Apply a cryptographic hash function to the policy coding (and optionally other data in header) to output hashed policy coding.

808

Inject policy coding and hashed policy coding into packet headers of packets from client device for a session and transmit to destination resource.

FIG. 8

ADDING POLICY CODING TO PACKET HEADERS FOR A USER AT A CLIENT DEVICE TO USE TO ACCESS RESOURCES IN A SECURE NETWORK

BACKGROUND OF THE INVENTION

1. Field of the Invention

The present invention relates to a computer program product, system, and method for adding policy coding to packet headers for a user at a client device to use to access resources in a secure network.

2. Description of the Related Art

Corporate networks implement authentication policies in boundary devices to authenticate users to access system resources. User permissions to access the resources may be defined in an access control system. When a user seeks to access a resource in a private or corporate network, the permissions of the requesting user in the access control system may be examined to determine whether to grant the user access.

Users may access a secure or corporate network through a Virtual Private Network (VPN). The VPN server in the corporate network authenticates the user for communications sent from a VPN client at the client device. After the user is authenticated to connect to the VPN, separate systems may be used to determine whether the user has the necessary authority and permissions to access requested resources in the corporate network.

SUMMARY

Provided are a computer program product, system, and method for adding policy coding to packet headers for a user at a client device to use to access resources in a secure network. Packets are received from a user at a client device. A determination is made of policy information for the user defining user permissions to access resources in the secure network. Packets from the user are decapsulated and policy information into is included in packet headers of the decapsulated packets to transmit within the secure network. An enforcement point applies policy rules to the policy information in the packet headers to determine whether to forward the packets to a destination resource.

BRIEF DESCRIPTION OF THE DRAWINGS

FIG. 4 illustrates an embodiment of operations at a client device to obtain a policy coding of policy information from the secure network to inject into packet headers of packets the client device sends to the secure network.

FIG. 5 illustrates an embodiment of operations at a client device to obtain a policy coding of policy information maintained locally in the client device to inject into packet headers of packets the client device sends to the secure network.

FIG. 6 illustrates an embodiment of a firewall including a packet decapsulation manager.

FIG. 7 illustrates an embodiment of a packet produced by the packet decapsulation manager of FIG. 6

FIG. 8 illustrates an embodiment of operations performed by the packet decapsulation manager in FIG. 6.

DETAILED DESCRIPTION

Figure 1:
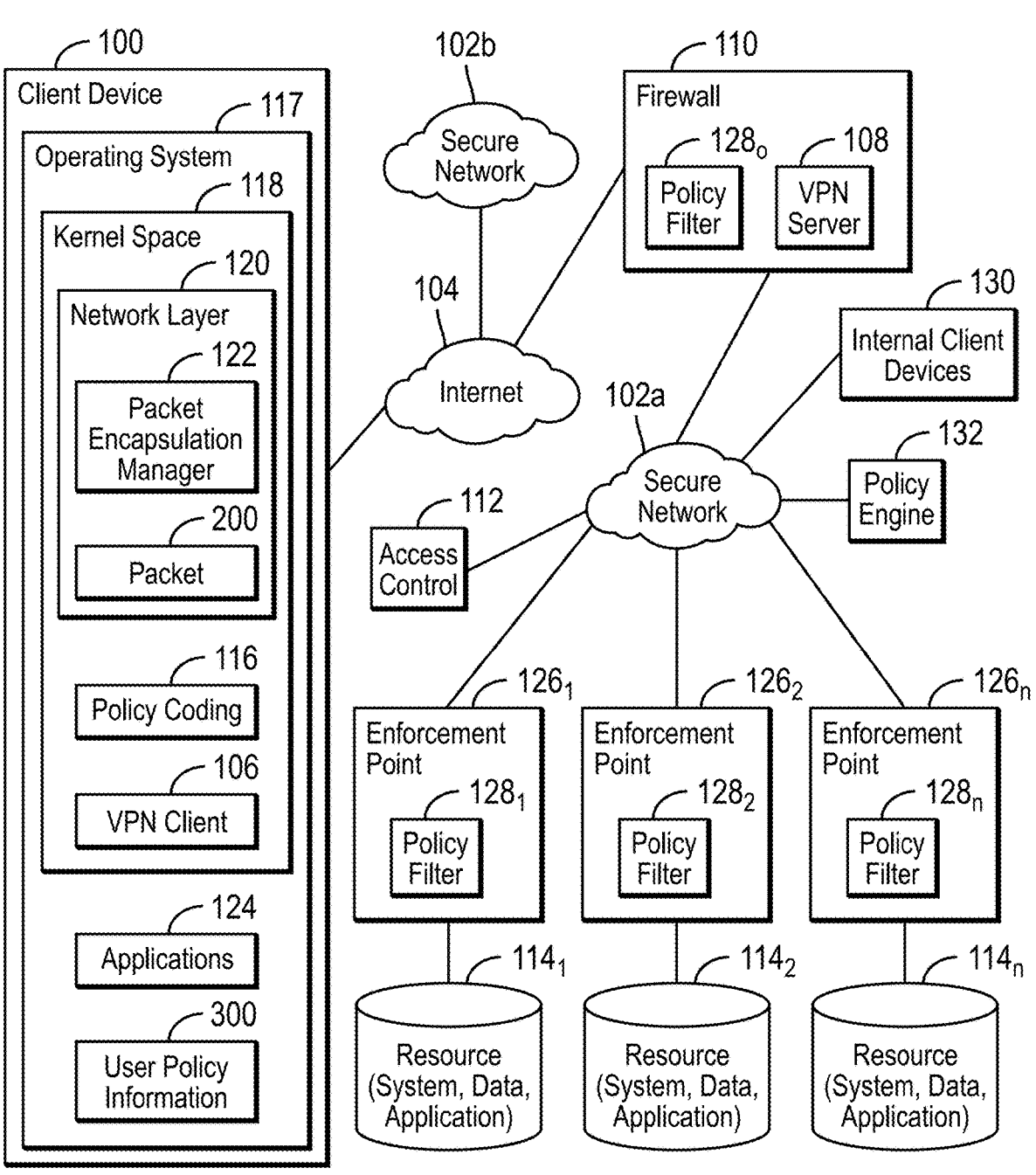
FIG. 1 illustrates an embodiment of a network computing environment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The description herein provides examples of embodiments of the invention, and variations and substitutions may be made in other embodiments. Several examples will now be provided to further clarify various embodiments of the present disclosure:

Example 1: A computer-implemented method for packet decapsulation for a secure network. The method further comprises receiving packets from a user at a client device. The method further comprises determining policy information for the user defining user permissions to access resources in the secure network. The method further comprises decapsulating packets from the user and including the policy information into packet headers of the decapsulated packets to transmit within the secure network. An enforcement point applies policy rules to the policy information in the packet headers to determine whether to forward the packets to a destination resource. Thus, embodiments advantageously allow for a zero-trust network by including policy information for a user in packet headers which enforcement points can use to determine whether packets should be forwarded to a destination resource.

Example 2: The limitations of any of Examples 1 and 3-8, where the method further comprises that the determining the policy information comprises determining a policy coding as a function of a user type of the user and user permissions in the secure network. The policy information inserted into the packet headers comprises the policy coding. Thus, embodiments advantageously including a policy coding in the packet headers determined as a function of a user type and user permissions to an allow enforcement point to determine whether each packet is permitted to access a destination resource.

Example 3: The limitations of any of Examples 1, 2 and 4-8, where the method further comprises that the policy coding comprises an encoded value indicating the user type of the user, the user permissions, a device type of the client device, network type over which the client device transmits the packets, and user permissions in the secure network. Thus, embodiments advantageously allow many different types of policy information to be encoded in a policy coding included in each header to provide many different dimensions along which an enforcement point can determine whether to allow packets to a destination resource.

Example 4: The limitations of any of Examples 1-3 and 5-8, where the method further comprises that the packets from the client device are included in a Virtual Private Network (VPN) tunnel and that the decapsulated packets from the VPN tunnel are transmitted as Internet Protocol (IP) packets within the secure network. Thus, embodiments advantageously provide for decapsulation of packets after being transmitted through a VPN tunnel so that the specialized handling and including of policy information in the packet headers is performed at the VPN server so that no special code is needed at the client device because decapsulation is handled at the VPN server side.

Example 5: The limitations of any of Examples 1-4 and 6-8, where the method further comprises the policy information is inserted in an extended header of the IP packets not currently being used by a network layer in the client device to transmit the packets. Thus, embodiments advantageously allow for use of existing optional headers in the IP packets to allow the decapsulation technique to be used with packets conforming to the ubiquitous IP protocol and not requiring specialized communication protocols.

Example 6: The limitations of any of Examples 1-5, 7, and 8, where the method further comprises that the policy information comprises a code representing an identity of the user. The enforcement points in the secure network use the identity of the user to determine access to the destination resource in the secure network. Thus, embodiments advantageously allow the enforcement points to use the user's identity included in the packet headers to determine whether packets from the identified user are permitted to be forwarded to the destination resource, without determine the policy information to include in the packet headers.

Example 7: The limitations of any of Examples 1-6 and 8, where the method further comprises applying a cryptographic function to the policy information to produce a hash code to insert in the packet headers for the user. The method further comprises the hash code is used to determine whether the hash code matches a subsequent hash from applying the cryptographic function to the policy information in the packet headers to authenticate the packets. Thus, embodiments advantageously allow the enforcement point to use a hash code cryptographic function to authenticate the policy information included in the packet header before using the policy information to determine whether a packet should be forwarded to the destination resource. In this way, and additional layer of zero-trust is included in authenticating the policy information.

Example 8: The limitations of any of Examples 1-7, where the method further comprises applying a cryptographic function to the policy information and additional information in the packet headers to produce a hash code to insert in the packet headers for the user. The hash code is used to determine whether the hash code matches a subsequent hash from applying the cryptographic function to the policy information and the additional information in the packet headers to authenticate the packets. Thus, embodiments advantageously provide for authentication of the policy information in the packet header by applying the cryptographic hash function to the policy information in the packet header and additional information in the packet header to enhance the authentication by including additional parts of the packet header in the authentication. In this way, and additional layer of zero-trust is included in authenticating the policy information.

Many private and corporate networks seek to adhere to a zero trust architecture, where inherent trust is removed so that those that connect to the network are not assumed to have access to network resources. In a zero trust architecture, each request for a resource is authenticated and determined to satisfy an access policy. Zero trust networks are a response to enterprise network trends that include remote users who provide their own devices, i.e., bring your own device (BYOD).

Described embodiments provide improvements to network technology to implement a zero trust network. In certain embodiments, in the client device, which may connect to the private network via the Internet, a component of the network layer of the client device may insert a policy coding, comprising encoded user policy information, in packet headers of packets the device transmits to the secure network. Resources within the secure network may then apply policy rules for a destination resource to the policy coding in the packet headers to determine whether to forward the packets to the destination resource. This allows the network to implement zero trust of all network traffic by requiring approval of packets by applying policy rules to policy information for the user in the packet headers to determine whether the user policy information satisfies the security requirements for access. This ensures that any traffic is dynamically filtered based on the appropriateness of the user and/or device attempting to connect to the service.

With described embodiments, devices outside the secure network, such as remote devices, transmit the policy information encoded in the packet headers so that enforcement points in the secure network can filter and apply policy rules to the policy information in the packet headers. Further, by authenticating the user at the client device and injecting the policy information in packet headers at the client device, this embodiment may enforce local device policies.

In further embodiments, the user policy information may be injected in the packet headers of packets at the VPN server upon receiving the packets from the client device and decapsulating the packets from the VPN client on the client device. One advantage of this embodiment, is there is no need to customize the VPN client or client device operations to inject the policy information in the packet headers. Instead, the policy information is injected at the VPN server when receiving packets to implement the zero trust architecture by requiring application of policy rules to the packet headers in packets to ensure they are from an authorized user. A further advantage of this embodiment is the policy information is not distributed to the client device 100 so that key material is less susceptible to attack by being kept within the secure network.

FIG. 1 illustrates an embodiment of a network environment having a client device 100 that connects to a secure network 102a, 102b over the Internet 104. The client device 100 includes a virtual private network (VPN) client 106 to communicate with a VPN server 108 in a firewall 110 to gain access to the secure network 102a through a VPN tunnel established between the VPN client 106 and the VPN server 108. Once the client device 100 is authenticated with the VPN server 108, the VPN server 108 may communicate with an access control system 112 to authenticate the client with the secure network 102a and determine permissions the user of the client device 100 has to access resources 114₁, 114₂ . . . 114ₙ in the secure network 102a. The VPN server 108, or other component, may include the permissions for a user in a policy coding 116 of policy information 300 for the user to return to the VPN client 106 when indicating confirmation of successful login. The client device 100, upon receiving the policy coding 116 from the VPN server, may inject the policy coding 116 into headers 202 of packets 200 at the client device 100 that are transmitted to the firewall 110.

Figure 2:
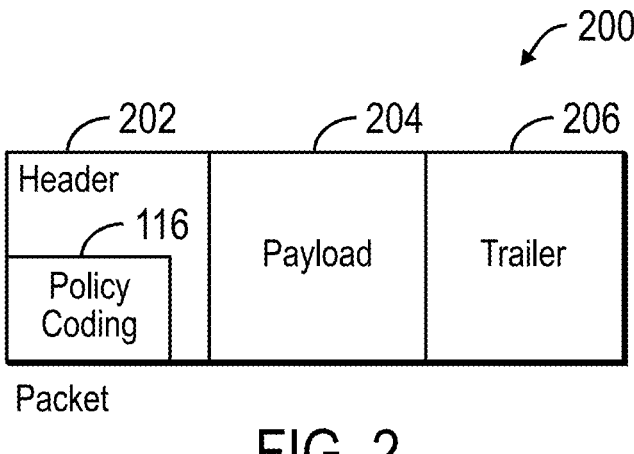
FIG. 2 illustrates an embodiment of a packet with a policy coding in the packet header.

The client device 100 communicating over the Internet 104 or other public network, includes an operating system 117 having a kernel space 118 in which a network layer 120 runs. The network layer 120 includes a packet encapsulation manager 122 to inject the policy coding 116 providing an encoding of policy information 300 into packet headers 202, shown in FIG. 2, of packets 200 generated by the network layer 120. The payload 204 of the packets 200 may be generated by applications 124 running in the client operating system 117. The payload 204 may include commands and requests directed to a destination resource 114$_i$ in the secure network 102$a$. A packet 200, as shown in FIG. 2, further includes a trailer 206 indicating an end of the packet. In certain embodiments, the client device 100 may maintain the user policy information 300 for the user of the client device 100 locally.

The network layer 120 may comprise a network stack implementing an Open Systems Interconnection (OSI) model having multiple layers. The network layer 120 may comprise the transport and network layers of the OSI mode where packet encapsulation is performed. The network layer 120 may implement the Transmission Control Protocol/Internet Protocol (TCP/IP) communication protocol or other protocols known in the art. In embodiments where the network layer 120 implements the TCP/IP protocol, the headers 202 may comprise IPv6 headers.

In embodiments where the operating system 117 comprises the Linux® operating system, the packet encapsulation manager 122 may be implemented as an extended Berkely Packet Filter (eBPF) to monitor the packets 200 being generated, determine the policy coding 116 for the user by interacting with the firewall 110 or access the policy coding 116 from local user policy information 300, and inject the policy coding 116, obtained for the user of the client device 100 into the packet 200 headers 202. Although the packet encapsulation manager 122 is shown in the network layer 120 it may be located elsewhere in the kernel 118 and invoked by the network layer 120 during the packet header encapsulation processes. The VPN client 106 may be located in the kernel space 118 or elsewhere in the operating system 117. (Linux is a registered trademark of Linus Torvalds throughout the world).

The secure network 102 includes one or more enforcement points 126$_1$, 126$_2$ . . . 126$_n$ that determine whether packet headers 202 of packets directed to a resource 114$_1$, 114$_2$ . . . 114$_n$ indicate sufficient permissions to access the resource. A policy filter 128$_1$, 128$_2$, 128$_n$ in the enforcement points 126$_1$, 126$_2$ . . . 126$_n$ and a policy filter 128$_o$ in the firewall 110 may inspect packet headers 202 of packets 200 from the client device 100 and apply policy rules to the policy coding 116 to determine whether to forward the packets to the destination resource 114$_i$. The secure network 102$a$ may extend to another secure network 102$b$ over the Internet 104. The secure network 102$a$ may further include internal client devices 130 communicating from within the secure network 102$a$ and a policy engine 132, which provides the rules the policy filters 128$_i$ apply to the policy coding 116 in the headers 202 to determine whether a packet 200 should be forwarded to a resource 114$_i$.

The resources 114$_1$, 114$_2$ . . . 114$_n$ may comprise network addressable systems, data, applications, etc. available to users of the secure network 102$a$ who have the permission to access the resources. The resources 114$_i$ may comprise servers or other devices accessible in the secure network 102$a$. The enforcement points 126$_1$, 126$_2$, 126$_3$ may be implemented in separate systems from the resources 114$_i$ they manage or embedded in systems also including the resources 114$_i$.

The policy coding 116 may comprise a numerical value, such as a hexadecimal code. The policy filters 128$_i$ at the enforcement points 126; apply rules from the policy engine 132 to the policy coding 116 in the header 202 to determine whether the packet 200 originates from a user authorized to access the resource 110$_i$. The policy coding 116 may include a coding of user policy information 300 to which the rules of the policy filters 128$_i$ are applied to determine whether the user is permitted access to a resource 114$_i$. The policy filter 128$_i$ determines whether the user type, client device geographical location, network type over which the client device 100 connects, and permissions indicated in the policy coding 116 are sufficient to allow access to the resource 114$_i$ to which the packet 200 is directed. In packets 200 implemented using the IPv6 protocol, the policy coding 116 may be included in one or more extension headers of the header 202, which are fields available for optional internet layer information between the fixed header and an upper-layer protocol header.

Figure 3:
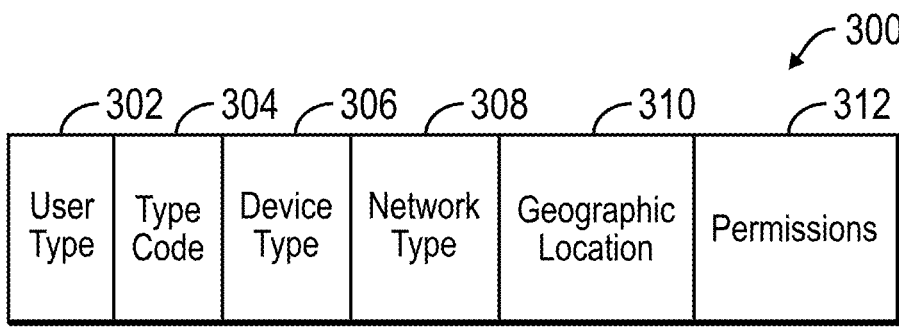
FIG. 3 illustrates an embodiment of policy information for a user.

FIG. 3 provides an embodiment of policy information 300, encoded in the policy coding 106, that the policy filters 128$_i$ process with rules from the policy engine 132 to determine whether to permit access. The policy information 300 may include a user type 302, such as a role in the organization providing the secure network 102$a$, e.g., executive, technical support, marketing, research, etc.; a user type code 304 providing a numerical representation of the user type 302; a device type 306 of the client device 100, such as smartphone, laptop, etc.; a network type indicating how the client device 100, 130 connects, e.g., public network 104, private network 102$a$, 102$b$, etc.; a geographic location 310 at which the client device 100 is located; and permissions 312 within the organization to which the user is permitted access. For instance, the permissions 312 may indicate departmental resources the user may access, such as servers and data for human resources, marketing, technical support, computational resources the user may access, e.g., command line utilities, etc. The different fields in the policy information 300 may be expressed as a numerical value and encoded in the policy coding 116, such as in the form of a hexadecimal number.

The policy information 300 may be obtained by the VPN sever 108 for a user when the user initiates a session with the firewall 110 through the access control system 112, and returned by the VPN server 108 to the client device 100 to generate a policy coding 116 to include in packets. Alternatively, the client device 100 may store the user policy information 300 locally for use after authenticating with the client device.

The program components of FIG. 1, including components 106, 108, 112, 1141, 114$_2$ . . . 114$_n$, 117, 118, 120, 122, 124, 126$_1$, 126$_2$ . . . 126$_n$, 128$_1$, 128$_2$ . . . 128$_n$, 132, among others, may comprise program code loaded into a memory and executed by one or more processors. Alternatively, some or all of the functions may be implemented as microcode or firmware in hardware devices, such as in Application Specific Integrated Circuits (ASICs), Field Programmable Gate Arrays (FPGAs), etc.

FIG. 4 illustrates an embodiment of operations performed at the client device 100, including the VPN client 134 and packet encapsulation manager 126, and other components, to inject a policy coding 116 into packets to send to the secure network 102$a$. The user at the client device 100 initiates (at block 400) a session, such as attempting to login. The VPN client 106 transmits (at block 402) user identity and authentication information, e.g., a password, and a request for user policy information 300 to the VPN server 108 at the firewall 110, or other device, to initiate the session. The VPN client 106 may include environmental information with the request, such as the device 100 type, network 104 type over which the client device 100 is communicating, etc. The VPN client 106 receives (at block 404) from the VPN server 108 indication that authentication approved along with a policy coding 116 encoding the user policy information 300 and other information to establish a VPN tunnel. Alternatively, the VPN client 106 may receive the policy information 300 and perform the encoding to generate the policy coding 116 at the client device 100. The network layer 120 may generate (at block 406) packets 200 with data 204 from applications 124. The packet encapsulation manager 122 may optionally encrypt and/or sign (at block 408) the policy coding 116, and optionally additional information in the header 202. The packet encapsulation manager 122 injects (at block 410) the policy coding 116, optionally encrypted/signed, into the packet header 202 of each packet 200, such as in extended header fields. The VPN client 134 wraps (a block 412) the packets 200 into a VPN package to transmit through a VPN tunnel to the firewall device 110.

With the embodiment of FIG. 4, an encapsulation manager automatically injects into the packet headers a policy coding 116 that may be used throughout the secure network 102a to determine whether the user of the client device 100 is permitted access to resources 114ᵢ.

FIG. 5 illustrates an embodiment of operations performed at the client device 100 including the VPN client 106 and packet encapsulation manager 126, and other components, to inject a policy coding 116, stored locally in the client device 100, into packets 200 to send to the secure network 102a. The user at the client device 100 initiates (at block 500) a session, such as attempting to login. The operating system 117, such as an access control program within the operating system 117, may authenticate (at block 502) the user locally. The network layer 120 may generate (at block 504) packets 200 with data 204 from applications 124. The packet encapsulation manager 122 may optionally encrypt and/or sign (at block 506) the policy coding 116, stored locally for the user in the client device 100, and optionally additional information in the header 202. The packet encapsulation manager 122 injects, i.e., includes, (at block 508) the policy coding 116, optionally encrypted/signed, into the packet headers 202 of the packets 200, such as in extended header fields. The VPN client 106 wraps (a block 510) the packets 200 into a VPN package to transmit through a VPN tunnel to the firewall device 110.

With the embodiment of operations of FIG. 5, the user is authenticated locally at the client device 100 and policy coding 116 is maintained locally to avoid latency from having to authenticate at the firewall 110. The packet encapsulation manager 122 automatically injects into the packet headers 202 a policy coding 116, maintained locally in the client device 100, that may be used throughout the secure network 102a to determine whether to forward the packets to the resources 114ᵢ.

FIGS. 6, 7, 8, and 9 illustrate an alternative embodiment where the packets are not injected with the user policy coding 116 at the client device 100, but instead injected at the VPN server. FIG. 6 illustrates a firewall 600 comprising an alternative embodiment of the firewall 110 in FIG. 1, including a policy filter 602, a VPN server 604, and a packet decapsulation manager 606 in the VPN server 604. The VPN server 604 may determine policy information 300 from the access control system 112 for a user authenticated through the VPN server 604 and generate a policy coding 704, by encoding the policy information 300, to inject into packets at the firewall 600.

FIG. 7 illustrates an embodiment of a packet 700 the VPN server 604 may generate from a received packet from the client device 100. The packet 700 includes a header 702 having a policy coding 704 comprising an encoding of policy information 300 for the sender of the packet from the access control system 112. The policy coding 704 may be in an encoded format, such as hexadecimal form. The packet decapsulation manager 606 may further inject into the packet header 702 a hashed policy coding 706 resulting from a cryptographic hash function applied to the policy coding 704. The packet 700 further includes a payload 708, sent from the client device 100, of commands to perform with respect to the destination resource 114ᵢ, indicated in the header 702, and a trailer 710 indicating an end of the packet 700. In packets 700 implemented using the IPv6 protocol, the policy coding 704 and hashed policy coding 706 may be included in one or more extension headers of the header 702, which are fields available for optional internet layer information between the fixed header and an upper-layer protocol header.

FIG. 8 illustrates an embodiment of operations performed at the VPN server 604 to process packets from the client device 100 directed toward a resource 114ᵢ. In the embodiment of FIGS. 6, 7, 8, and 9, the client device 100 does not include a policy coding in the packets. Upon receiving (at block 800) packets from the client device 100 through a VPN tunnel, the VPN server 604 extracts (at block 802) the packets from the VPN package. The VPN server 604 determines (at block 804) policy information 300 for the user, which may be obtained from the access control system 112 for the identity of the user, and generates a policy coding 704 comprising an encoding of the policy information 300. The VPN server 604 applies (at block 806) a cryptographic hash function to the policy coding 704, and optionally other data in predefined fields of the header 202, to output a hashed coding policy 706. In one embodiment, the cryptographic hash function may generate a hashed message authentication code (HMAC) from the policy coding 704. The packet decapsulation manager 606 may process the extracted packets 200 to inject (at block 808) the policy coding 704 and the hashed policy coding 706 into the packet headers 702 of packets 700 from the client device 100 for a session and transmit to a destination resource 114ᵢ indicated in the packet header 702 from the client device 100

With the embodiment of FIG. 8, the VPN server 604 injects the policy coding 704 and hashed policy coding 706 when decapsulating packets from the VPN tunnel. The policy filters 128ᵢ in the enforcement points 126ᵢ may apply rules to the policy coding 704 to determine if the user may access the protected resource 114ᵢ.

In an alternative embodiment, the injection operations by the packet decapsulation manager 606 may use the user identity, such as an encoded serial number, instead of the policy coding 704, so the enforcement points 126; consult user identity rather than a coding of policy information.

Figure 9:
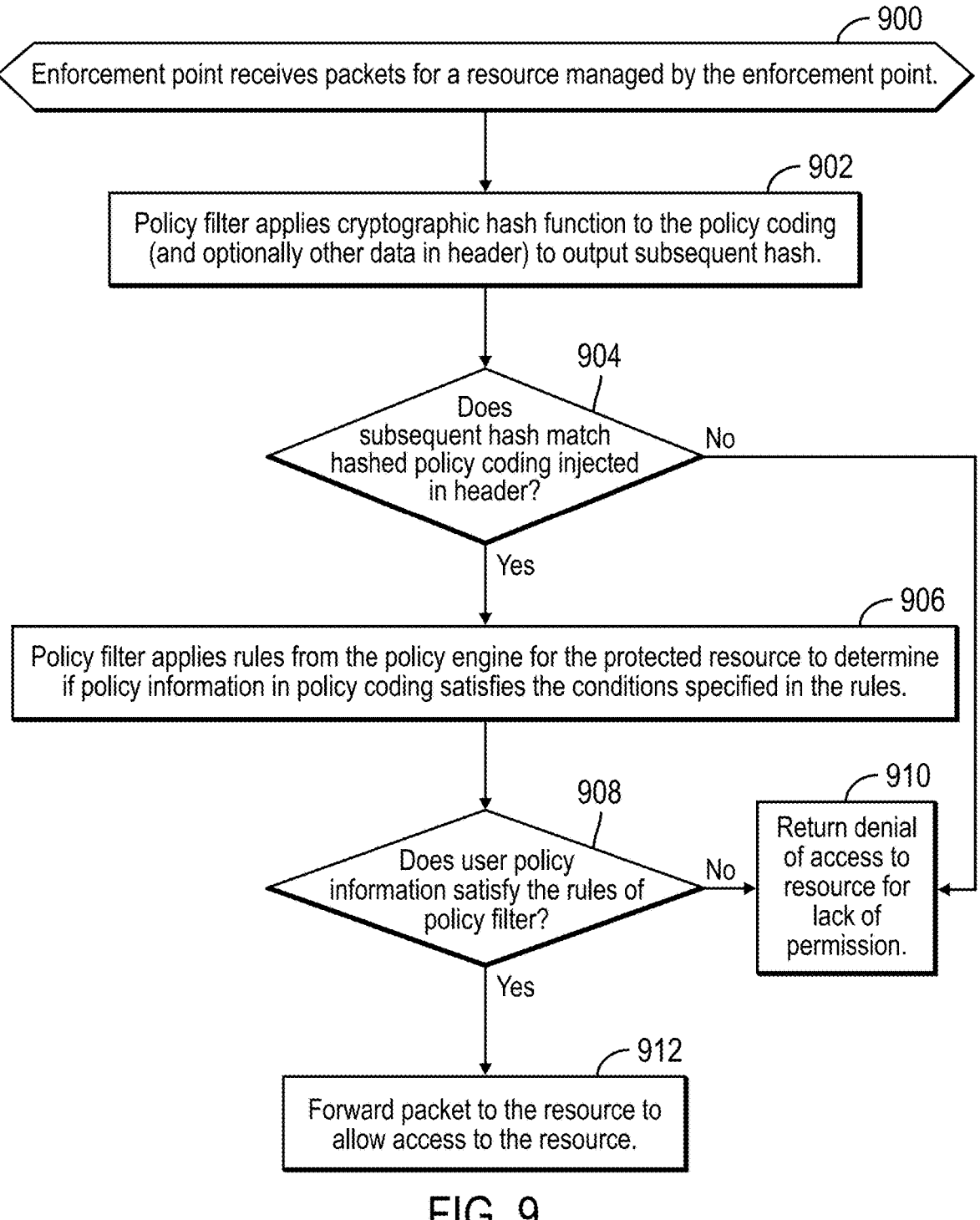
FIG. 9 illustrates an embodiment of operations to process the coding policy at an enforcement point to determine whether to forward the packets to the destination resource.

FIG. 9 illustrates an embodiment of operations performed at the policy filter 128ᵢ in an enforcement point 126ᵢ to determine whether packets, from the client device of FIG. 1, should be forwarded to a destination resource 114ᵢ indicated in the destination fields of the header 202 Upon (at block 900) the enforcement point 126ᵢ receiving packets 700 directed to a destination resource $114_i$ managed by the enforcement point $126_i$, the policy filter $128_i$ in the receiving enforcement point $126_i$ applies (at block 902) a cryptographic hash function to the policy coding 704 in the packet header 202 (and optionally other data in the header 202) and outputs a subsequent hash. If (at block 904) the subsequent hash matches the hashed policy coding 706 injected in the header 702, then the policy coding 704 is authenticated for the embodiment of FIGS. 6-8. Alternatively, for the embodiment of FIGS. 1-5 when the client device 100 encrypts or signs the policy coding 116 in the packet header 202, the enforcement point $126_i$ may decrypt/authenticate the encrypted/signed policy coding 116 to determine whether to allow access to the destination resource $114_i$ based on the policy indicated in the decrypted/authenticated policy coding 116.

The policy filter $128_i$ applies (at block 906) rules from the policy engine 132 for the protected resource $114_i$ to determine if the policy information in the policy coding 704 satisfies the conditions specified in the rules. For instance, the rules applied by the policy filter $128_i$ may provide conditions for environmental policy information in the encoding, such as network type 308, geographic location 310, or user specific policy information, such as user type 304, device type 306, and permissions 312. If (at block 908) the user policy information in the policy coding 704 does not satisfy the rules at the policy filter $128_i$ or if (at block 904) the subsequent hash does not match the hashed policy coding 706 injected in the header, then a denial of access is returned (at block 910) to the requesting client device 100 denying access to the destination resource $114_i$ indicated in the packet headers 702. The denial of access message may indicate the policy information 300 that did not satisfy the rules for the protected resource $114_i$. If (at block 908) the user policy information satisfies the rules applied by the policy filter $128_i$, then the packet is forwarded (at block 912) to the destination resource $114_i$ to process.

The operations of FIG. 9 apply where the policy coding 704 and hashed policy coding 706 are added by the packet decapsulation manager 606 in FIG. 8. In an alternative embodiment, the operations of FIG. 9 may apply when the policy coding 116 is added by the packet encapsulation manager 122 at the client device 100 according to the embodiment of FIGS. 1-5. In such case, policy filter $128_i$ may decrypt or authenticate the signed policy coding 116 included in the packet header 202, and then proceed to block 906 to determine whether to forward the packet to the resource $114_i$ based on the policy coding 116

The VPN server 604 upon receiving a reply from the enforcement point 126; or destination resource $114_i$, includes the returned packets in VPN packages to return to the client device 100 through a VPN tunnel. In embodiments, where the client device is an internal client device 130, the response from the resource $114_i$ in a TCP/IP package may be returned to the internal client device 130 without packaging in a VPN tunnel.

With the embodiment of FIGS. 6-9, because the packet header 702 is injected with the policy coding 704 and hashed policy coding 706 after the packet has left the VPN tunnel and reached the VPN server 604, the resulting path maximum transmit unit (PMTU) loss is smaller than in the case of FIG. 1 where the client device 100 injects the policy information in the header 202 and the packet carries the header 202 information through the VPN tunnel. If the packet header 702 header is larger than the VPN tunnel header, then the VPN server 604 may adjust the PMTU value it reports to the VPN client 106.

The present invention may be a system, a method, and/or a computer program product. The computer program product may include a computer-readable storage medium (or media) having computer-readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 10:
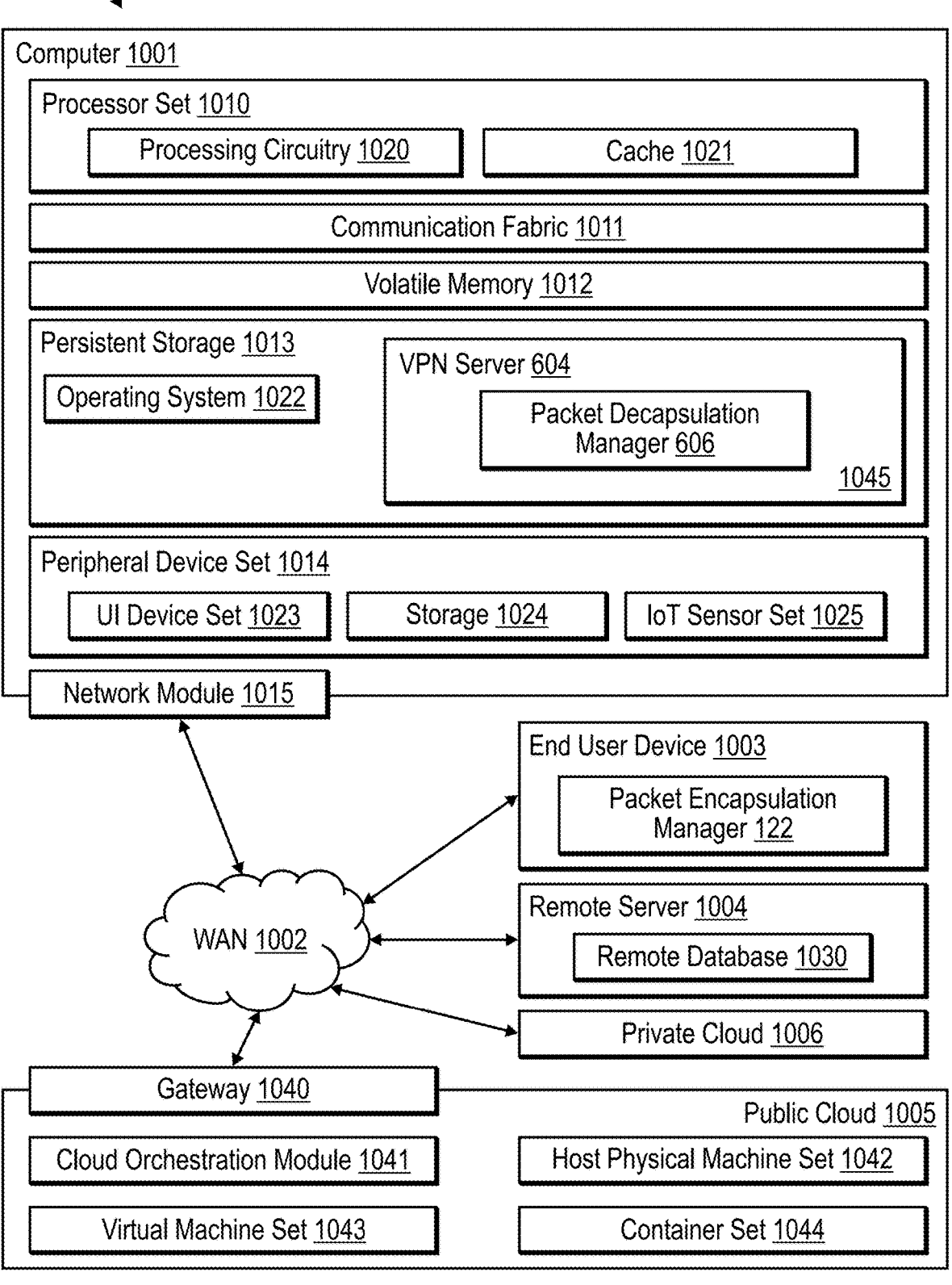
FIG. 10 illustrates a computing environment in which the components of FIGS. 1 and 6 may be implemented.

With respect to FIG. 10, computing environment 1000 contains an example of an environment for the execution of at least some of the computer code involved in performing the inventive methods, such as packet encapsulation and decapsulation to inject a policy coding in packets transmitted through the secure network 102a. the computer 1001 includes code block 1045 having a VPN server 604 including a packet decapsulation manager 606. In addition to block 1045, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1045, as identified above), peripheral device set 1014 (including user interface (UI) device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer-readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 1045 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up buses, bridges, physical input/output ports and the like.

Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, volatile memory 1012 is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface-type operating systems that employ a kernel. The code included in block 1045 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer-readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN 1002 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may comprise the client device 100 including a packet encapsulation manager 122, such as thin client, heavy client, mainframe computer, desktop computer and so on.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005.

The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud. In described embodiments, the private cloud 1006 may comprise the secure network 102a and components therein having the resources the computer 1001 accesses. The private cloud 1006 may include a VPN server 605 and packet decapsulation manager 606 for the embodiments of FIGS. 6-8.

CLOUD COMPUTING SERVICES AND/OR MICRO-SERVICES (not separately shown in FIG. 10): private and public clouds 1006 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks. The cloud computing services may comprises the resources 114, described above.

The letter designators, such as i and n, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for packet decapsulation for a secure network, the computer program product comprising a computer readable storage medium having computer readable program code embodied therein that when executed performs operations, the operations comprising:
    receiving packets from a user at a client device;
    determining policy information for the user defining user permissions to access resources in the secure network;
    decapsulating packets from the user; and
    including the policy information into packet headers of the decapsulated packets to transmit within the secure network, wherein an enforcement point applies policy rules to the policy information in the packet headers to determine whether to forward the packets to a destination resource.

2. The computer program product of claim 1, wherein the determining the policy information comprises:
    determining a policy coding as a function of a user type of the user and user permissions in the secure network, wherein the policy information inserted into the packet headers comprises the policy coding.

3. The computer program product of claim 2, wherein the policy coding comprises an encoded value indicating the user type of the user, the user permissions, a device type of the client device, network type over which the client device transmits the packets, and user permissions in the secure network.

4. The computer program product of claim 1, wherein the packets from the client device are included in a Virtual Private Network (VPN) tunnel and wherein the decapsulated packets from the VPN tunnel are transmitted as Internet Protocol (IP) packets within the secure network.

5. The computer program product of claim 4, wherein the policy information is inserted in an extended header of the IP packets not currently being used by a network layer in the client device to transmit the packets.

6. The computer program product of claim 1, wherein the policy information comprises a code representing an identity of the user, wherein enforcement points in the secure network use the identity of the user to determine access to the destination resource in the secure network.

7. The computer program product of claim 1, wherein the operations further comprise:
    applying a cryptographic function to the policy information to produce a hash code to insert in the packet headers for the user, wherein the hash code is used to determine whether the hash code matches a subsequent hash from applying the cryptographic function to the policy information in the packet headers to authenticate the packets.

8. The computer program product of claim 1, wherein the operations further comprise:
    applying a cryptographic function to the policy information and additional information in the packet headers to produce a hash code to insert in the packet headers for the user, wherein the hash code is used to determine whether the hash code matches a subsequent hash from applying the cryptographic function to the policy information and the additional information in the packet headers to authenticate the packets.

9. A system for packet decapsulation for a secure network, comprising:

a processor; and a computer readable storage medium having computer readable program code embodied therein that when executed performs operations, the operations comprising:

receiving packets from a user at a client device;

determining policy information for the user defining user permissions to access resources in the secure network;

decapsulating packets from the user; and including the policy information into packet headers of the decapsulated packets to transmit within the secure network, wherein an enforcement point applies policy rules to the policy information in the packet headers to determine whether to forward the packets to a destination resource.

10. The system of claim 9, wherein the determining the policy information comprises:

determining a policy coding as a function of a user type of the user and user permissions in the secure network, wherein the policy information inserted into the packet headers comprises the policy coding.

11. The system of claim 9, wherein the packets from the client device are included in a Virtual Private Network (VPN) tunnel and wherein the decapsulated packets from the VPN tunnel are transmitted as Internet Protocol (IP) packets within the secure network.

12. The system of claim 11, wherein the policy information is inserted in an extended header of the IP packets not currently being used by a network layer in the client device to transmit the packets.

13. The system of claim 9, wherein the policy information comprises a code representing an identity of the user, wherein enforcement points in the secure network use the identity of the user to determine access to the destination resource in the secure network.

14. The system of claim 9, wherein the operations further comprise:

applying a cryptographic function to the policy information to produce a hash code to insert in the packet headers for the user, wherein the hash code is used to determine whether the hash code matches a subsequent hash from applying the cryptographic function to the policy information in the packet headers to authenticate the packets.

15. A computer implemented method for packet decapsulation for a secure network, comprising:

receiving packets from a user at a client device;

determining policy information for the user defining user permissions to access resources in the secure network;

decapsulating packets from the user; and including the policy information into packet headers of the decapsulated packets to transmit within the secure network, wherein an enforcement point applies policy rules to the policy information in the packet headers to determine whether to forward the packets to a destination resource.

16. The computer implemented method of claim 15, wherein the determining the policy information comprises:

determining a policy coding as a function of a user type of the user and user permissions in the secure network, wherein the policy information inserted into the packet headers comprises the policy coding.

17. The computer implemented method of claim 15, wherein the packets from the client device are included in a Virtual Private Network (VPN) tunnel and wherein the decapsulated packets from the VPN tunnel are transmitted as Internet Protocol (IP) packets within the secure network.

18. The computer implemented method of claim 17, wherein the policy information is inserted in an extended header of the IP packets not currently being used by a network layer in the client device to transmit the packets.

19. The computer implemented method of claim 15, wherein the policy information comprises a code representing an identity of the user, wherein enforcement points in the secure network use the identity of the user to determine access to the destination resource in the secure network.

20. The computer implemented method of claim 15, further comprising:

applying a cryptographic function to the policy information to produce a hash code to insert in the packet headers for the user, wherein the hash code is used to determine whether the hash code matches a subsequent hash from applying the cryptographic function to the policy information in the packet headers to authenticate the packets.

* * * * *